United States Patent [19]

McManus et al.

[11] Patent Number: 5,009,947
[45] Date of Patent: Apr. 23, 1991

[54] ELASTOMERIC STRIP AND METHOD OF MANUFACTURE

[75] Inventors: Michael J. McManus; David H. Berry; Harold P. Dover, all of Maryville, Tenn.

[73] Assignee: Schlegel Corporation, Rochester, N.Y.

[21] Appl. No.: 345,612

[22] Filed: Apr. 28, 1989

[51] Int. Cl.$^5$ .............................................. E06B 7/16
[52] U.S. Cl. ...................................... 428/122; 49/490; 52/400; 428/358
[58] Field of Search ..................... 52/400; 49/490; 428/122, 358

[56] References Cited

U.S. PATENT DOCUMENTS

| | | | |
|---|---|---|---|
| 3,091,821 | 6/1963 | Cook, Jr. | 428/122 X |
| 3,198,689 | 8/1965 | Lansing | 428/122 X |
| 3,343,845 | 8/1982 | Burden et al. | 428/122 |
| 4,413,033 | 11/1983 | Weichman | 428/122 |
| 4,517,233 | 5/1985 | Weichman | 49/490 X |
| 4,624,093 | 11/1986 | Gibson | 49/490 X |

FOREIGN PATENT DOCUMENTS 53-75627  5/1978  Japan .................................. 428/122

Primary Examiner—Henry E. Epstein
Attorney, Agent, or Firm—Cumpston & Shaw

[57] ABSTRACT

An elastomeric strip of substantially U-shaped cross-section is disclosed which is adapted to be mounted on a flange having longitudinally-spaced curved sections. The elastomeric strip includes a support frame having longitudinally displaceable frame portions that are reinforced with longitudinally extending degradable reinforcing material. The reinforced support frame is advanced through an extrusion die where a coating of an elastomeric material is extruded on the support frame to form an elastomeric strip without degrading the degradable material. Longitudinally-spaced regions of the degradable reinforcing material corresponding to the longitudinally-spaced curved sections of the flange are then degraded, allowing the elastomeric strip to more faithfully follow the curved sections of the flange when the strip is mounted thereon.

5 Claims, 2 Drawing Sheets

ELASTOMERIC STRIP AND METHOD OF MANUFACTURE

BACKGROUND OF THE INVENTION

1. Field of the Invention

The invention relates to an elastomeric strip, preferably of the channel-shaped type, for sealing and/or decorative purposes, such as, for example, gripping and covering edge flanges on the periphery of a vehicle door, a door opening or the like. More particularly, the invention relates to an improved elastomeric strip and method of manufacture in which the strip is provided with longitudinally-spaced degraded regions, corresponding to the longitudinally-spaced curved sections of the flange, whereby the degraded regions of the elastomeric strip can faithfully follow the curved sections of the flange when the strip is mounted thereon.

2. Description of the Prior Art

U.S. Pat. No. 4,343,845 which issued to Burden et al on Aug. 10, 1982, discloses (see FIG. 1A) an elastomeric strip 1 and method of manufacturing the same, in which the elastomeric strip 1 had a selected lateral region 2 along the length thereof reinforced with degradable material 4 and at least one other lateral region 3 reinforced with material that is non-degradable. Accordingly, when the weatherstrip is subjected to degradation conditions, the degradable material 4 in the selected region 2 is degraded and the non-degradable material 5 is in the other region 3 is not degraded. The degraded material breaks when the strip is flexed, so that longitudinal displacement of the selected region of the frame portion is no longer inhibited, resulting in an elastomeric strip of improved flexibility. The longitudinal displacement of the other region 3 is maintained for preventing undue elongation or stretching of the strip. More specifically, selected laterally spaced apart regions 2, 3 of the displaceable frame portions of the strip, such as the central and/or outer regions or portions thereof are reinforced with a degradable and a non-degradable material respectively. Subsequently, the entire weather strip is subjected to a degrading environment and only the degradable material is selectively degraded resulting in increased flexibility of the strip, allowing it to faithfully accommodate inside, outside, and lateral curves, or combinations thereof. Also, limited elongation of the strip is achieved due to the presence of non-degraded material.

Japanese Patent Application No. 75627/78, shows a channel-shaped elastomeric strip having a ladder-like frame having a plurality of parallel, spaced-apart metal rungs joined together by thin webs. A strip degrading apparatus comprising a power source is disclosed having prongs insertable through the strip coating and into contact with a pair of adjacent metal rungs for applying electrical current thereto. This causes the thin web between the two metal rungs to melt, allowing elongation of the strip to occur in this region.

Problems occur in attempting to utilize the teachings of these patents in connection with the assembly of an automobile or the like, in which an elastomeric strip of finite length is mounted on a flange surrounding a door or a door opening, for example. One problem is that it is necessary for the automobile manufacturer receiving the elastomeric strip to degrade the sections of the strip conforming to the curved sections of the flange. This operation is time consuming, thereby adversely affecting the efficiency of the manufacturing operation. Additionally, the operation requires apparatus on hand to handle the strips and perform the breaking or degrading operation, threby adversely affecting plant space considerations.

Another problem is presented by the prior art in relation to achieving degredation of longitudinally-spaced regions of the elastomeric strip. To achieve such degredation, it is necessary for the prongs of the strip degrading apparatus to pierce the elastomeric coating of the strip and to contact longitudinally-spaced wires or rungs of the strip support frame. Since the wires and rings are covered by the coating, it is difficult to accurately position the strip degrading apparatus so that the prongs accurately engage them, resulting in a hit-and-run operation. With the wire support frame, such prong and wire engagement is virtually impossible.

SUMMARY OF THE INVENTION

In accordance with a preferred embodiment of this invention, an elastomeric strip of substantially U-shaped cross-section and of a finite length is disclosed for mounting on a flange having longitudinally-spaced curved sections. The finite length of elastomeric strip is provided with a plurality of longitudinally-spaced degraded regions corresponding to the longitudinally-spaced curved sections of the flange. Accordingly, all a manufacturer has to do upon receipt of the elastomeric strip of finite length is to mount it on a flange with the degraded regions accurately and faithfully following the curved sections of the flange.

In another aspect of the invention, a method of manufacturing the elastomeric strip of finite length involves continuously advancing a reinforced wire support frame through an extrusion die, and then intermittently advancing the elastomeric strip through spaced heat applicators. The heat from the heat applicators effectively degrades the longitudinally-spaced regions of the degradable reinforcing material of the strip corresponding to the longitudinally-spaced curved sections of a flange.

In a further aspect of the invention, the elastomeric strip is continuously advanced in synchronism with the spaced heat applicators for degrading longitudinally-spaced regions of the degradable reinforcing material of the strip corresponding to the longitudinally-spaced curved sections of the flange.

The invention and its advantages will become more apparent from the detailed description of the invention presented below.

BRIEF DESCRIPTION OF THE DRAWINGS

The details of the invention will be described in connection with the accompanying drawings, in which.

DETAILED DESCRIPTION OF THE INVENTION

Figure 1A:
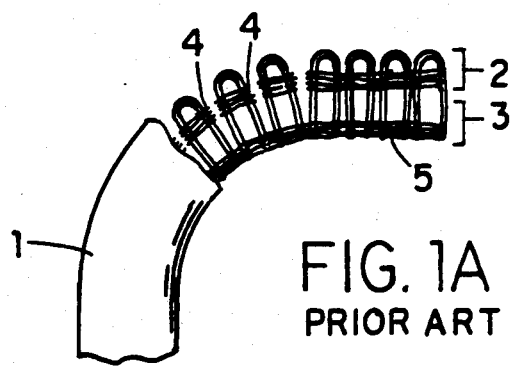
FIG. 1A is a fragmented side-elevation partly broken away of a weatherstrip in accordance with the prior art.
Figure 2:
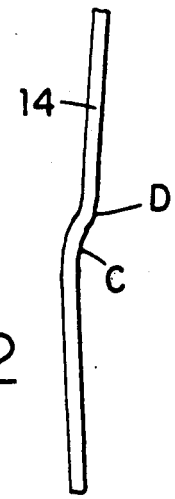
FIG. 2 is a segmental elevational view of a curved section of the flange substantially at the beltline taken in the direction of the arrow A.
Figure 1:
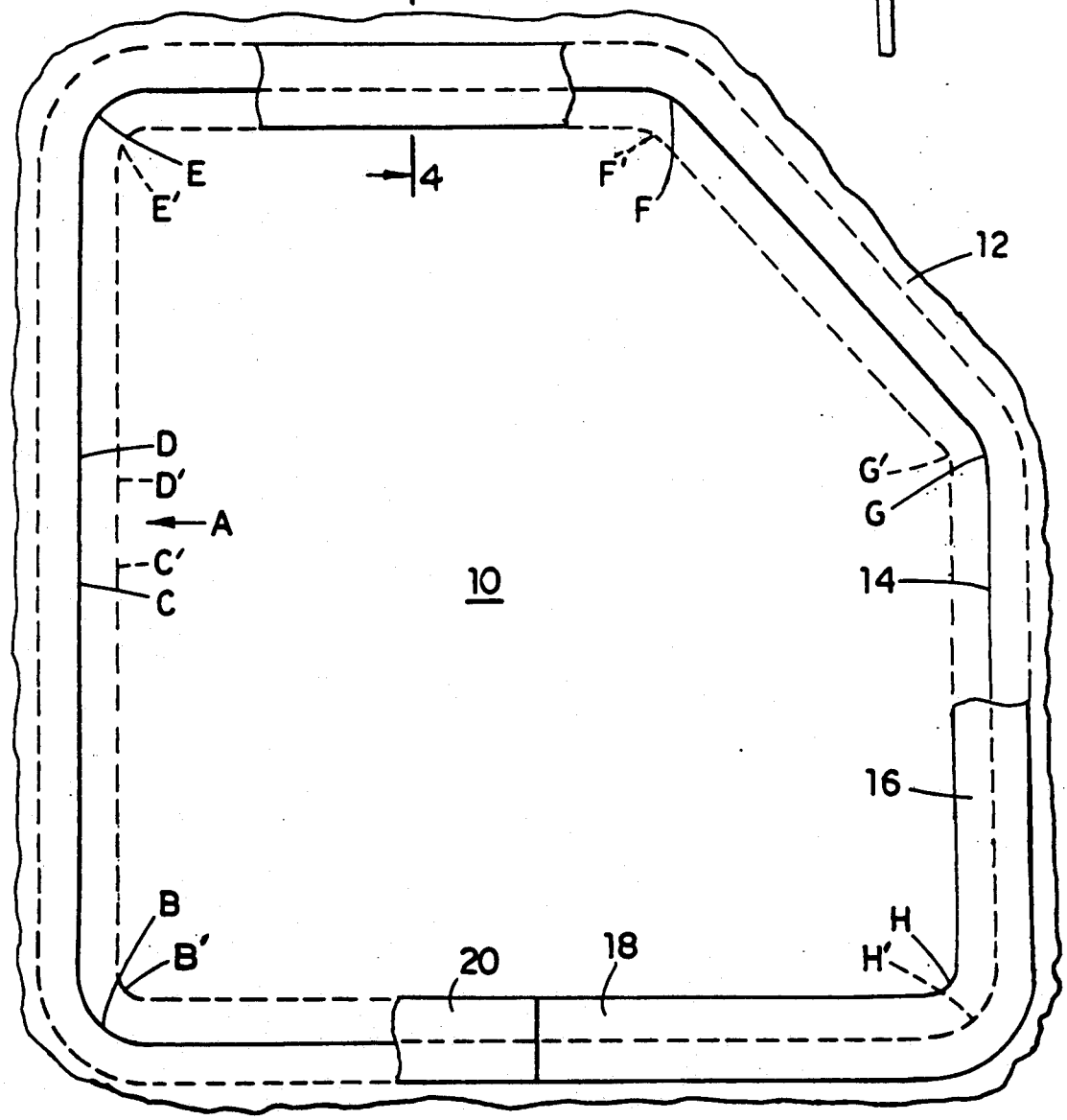
FIG. 1 is a segmental front elevational view of a door opening in a vehicle body having a flange on the periphery of the opening onto which an elastomeric strip of finite length is mounted.

With reference to FIGS. 1 and 2, a door opening 10 is disclosed in a vehicle body 12 having a flange 14 along the outer periphery of the opening, onto which an elastomeric strip 16 of finite length is mounted. The flange 14 has a plurality of curved sections B, C, D, E, F, G and H. An object of this invention is to provide an elastomeric strip of finite length for completely covering flange 14 without any leakage gap between ends 18, 20 of the elastomeric strip, or at the curved sections B-H of flange 14.

Figure 3:
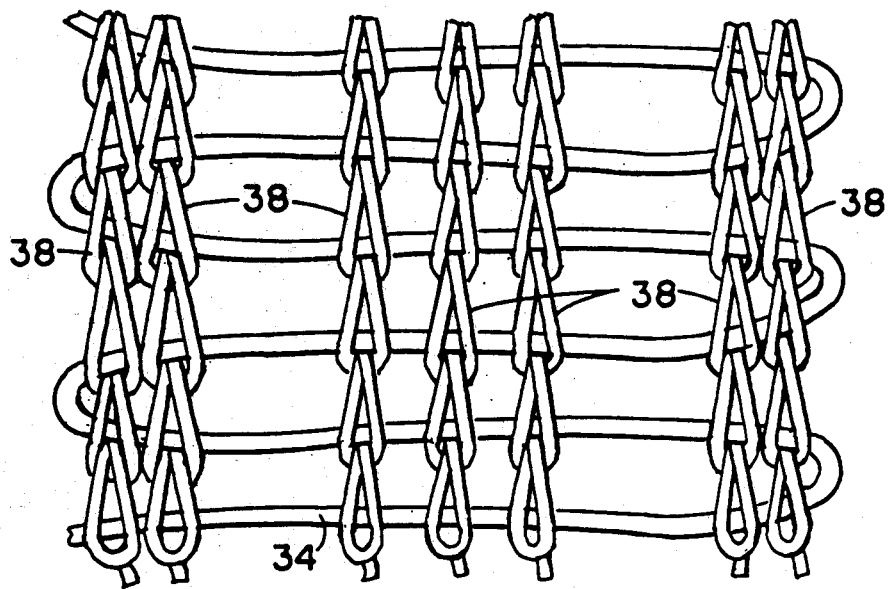
FIG. 3 is an enlarged fragmentary plan view of the frame section showing the degradable material before the frame section is bent into a channel shape, and prior to advancing through the extrusion die.
Figure 4:
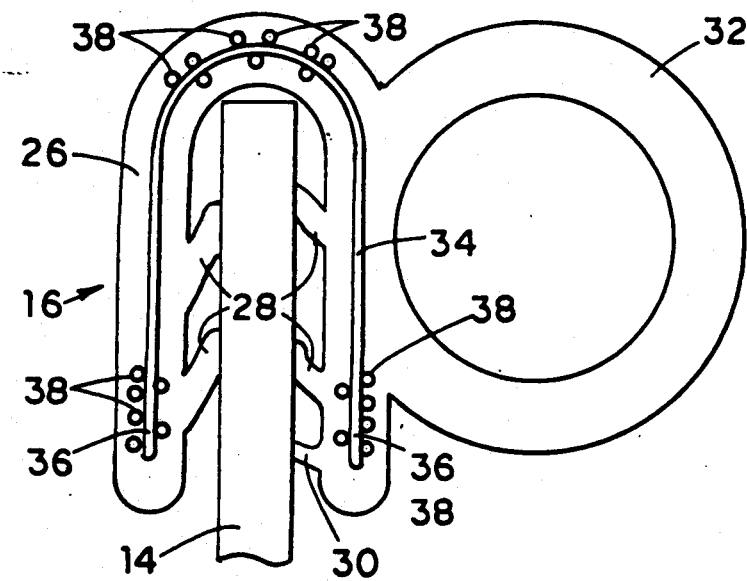
FIG. 4 is an enlarged view in section of the elastomeric strip taken substantially along line 4—4 of FIG. 1.

With reference to FIGS. 3 and 4, a known type of wire support frame 22 is disclosed that is coated by any suitable elastomeric or polymeric material 26 to form strip 16. The frame 22 may be coated on at least one surface with one material, or with separate materials of differing hardness. The elastomeric strip 16, which is exemplary only, further has flange gripping fins 28, a sealing lip 30, and a bulb 32. The invention can be embodied in any other form of strip, such as an edge protector trim strip, or a glazing strip, for example, not shown, where a support frame 22 is used and increased flexibility of the elastomeric strip at curved sections is desired without undue elongation or stretching of the remainder of the strip.

The support frame 22 preferably comprises a wire 34 arranged in a serpentine or zig zag path to provide looped portions 36 that are longitudinally displaceable prior to coating. Frame 22 could comprise any other suitable material and form, such as a ladder-like structure, for example, not shown. To prevent longitudinal displacement of support frame 22 or looped portions 36 thereof due to the hydraulic forces generated during the coating operation, the frame portions are maintained in spaced relation with one another by a reinforcing material, such as by interweaving, knitting or knotting with them a pluralitY of strands 38 of material that will not break down during the manufacture of the elastomeric strip. Such strands 38 are preferably interwoven adjacent the looped portions 36 at the edge regions of the frame, and a plurality of such strands are interwoven through the central region of the frame. Such strands, of which polyethylene or polyester are exemplary, are selected to have a melting temperature such that they retain their reinforcing strength during at least the coating step of manufacturing the elastomeric strip. However, when the strip is subjected to a temperature higher than the coating process temperature, the strands 38 are melted or degraded. When the finished elastomeric strip is flexed during installation on a flange or the like, the degraded material breaks or gives allowing increased flexbility of the strip.

Figure 5:
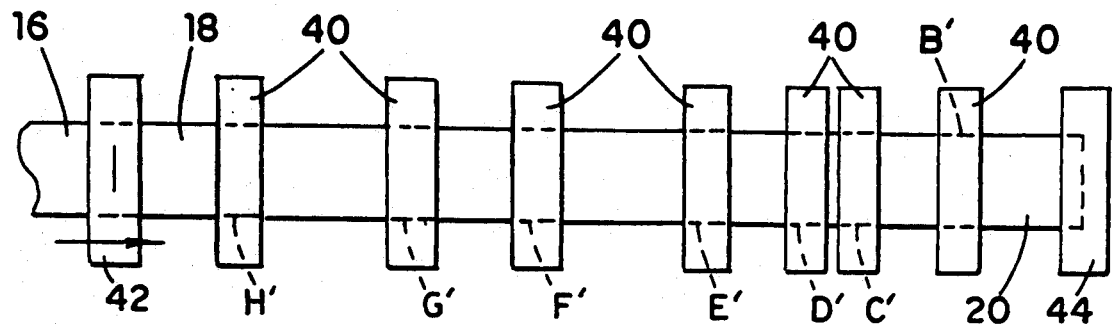
FIG. 5 is a top plan view of a degrading station at which longitudinally-spaced regions of the degradable reinforcing material of the elastomeric strip corresponding to longitudinally-spaced curved sections of the flange are degraded.

Referring to FIG. 5, a degrading station is disclosed at which longitudinally-spaced regions B', C', D', E', F', G', and H' of the degradable reinforcing material of the elastomeric strip corresponding to the longitudinally-spaced curved sections B, C, D, E, F, G, and H respectively of the flange are degraded. A plurality of heat applicators, such as induction coils 40, for example are fixedly mounted in spaced relation with the spacing therebetween established to conform to the space between longitudinally-spaced curved sections B-H of flange 14. A cutting mechanism 42 is provided spaced from the degraded region H' of the elastomeric strip a distance equal to the distance between the end surface of strip end 18 and the degraded region H' shown in FIG. 1. In a coating process in which support frame 22 is fed through an extrusion die, not shown, at a high rate of speed and an elastomeric material 26 extruded thereon, the formed elastomeric strip 16 is continuously fed into any suitable strip accumulator, not shown, and the strip fed intermittently therefrom by hand or automatically by a conveyor, not shown, or the like into and through the degrading station. The leading end of elastomeric strip 16 is properly positioned at a fixed stop position by any suitable mechanical or optical sensing mechanism 44. The induction coils 40 are energized and remain coupled with the strip 16 for a predetermined time to degrade the longitudinally-spaced regions B'-H' of the degradable reinforcing material 38 of the strip. Upon actuation of cutting mechanism 42, an elastomeric strip of finite length is severed from strip 16, and the operation is repeated.

Although not shown, it is conceivable that elastomeric strip 16 could be continuously fed from the strip accumulator through the degrading station, and spaced heat applicators mounted on a reciprocally movable or endless track, not shown, for transporting the heat applicators in synchronism with the longitudinally-spaced regions B'-H' of the elastomeric strip to be degraded. Alternatively, strip 16 could be transported through a single degrading mechanism that is selectively energized synchronously with the selected regions B'-H' of the strip as they pass the degrading mechanism for degrading such regions.

The elastomeric strips of finite length exiting from the degrading station are collected and supplied to manufacturers for application to endless flanges 14 surrounding door opening 10 or the like. Alternatively, the strip ends 18, 20 are bonded to form a loop. With reference to FIG. 1, one or both ends 18, 20 of strip 16 is applied to flange 14 at a point intermediate the curved sections B and H, and the strip mounted on the flange with the lontigudinally-spaced degraded regions B'-H' thereof conforming or corresponding to the longitudinally-spaced curved sections B-H respectively.

While a presently preferred embodiment of the invention has been shown and described with particularity, it will be appreciated that various changes and modifications may suggest themselves to one having ordinary skill in the art upon being apprised of the present invention. For example, while heat degradable strands are presently preferred, strands that are degradable by other means such as irradiation, chemical processing, mechanical means, or the like, could be employed in combination with a compatible degrading station. It is intended to encompass all such changes and modifications as fall within the scope and spirit of the appended claims.

What is claimed is:

1. An elastomeric strip of substantially U-shaped cross section of a finite length and a finite width for mounting on a flange having longitudinally-spaced curved sections, comprising:

a support frame having longitudinally displaceable frame portions;

longitudinally extending degradable reinforcing materials secured to the frame portions for reinforcing the frame portions to inhibit longitudinal displacement of the frame portions during the coating operation;

a coating of elastomeric material on at least one surface of a reinforced support frame; and a plurality of longitudinally-spaced degraded regions of the degradable reinforcing material of the strip in which all of the reinforcing material is degraded, such that the degraded regions of the strip are substantially unrestricted longitudinally by the reinforcing material and correspond to the longitudinally-spaced curve sections of the flange, whereby the degraded regions more faithfully follow the curved sections of the flange when the elastomeric strip is mounted thereon.

2. An elastomeric strip according to claim 1 wherein the support frame comprises a continuous wire arranged in a zig zag pattern to form the longitudinally displaceable frame portions.

3. An elastomeric strip according to claim 1 wherein the degradable reinforcing material comprises warp threads.

4. An elastomeric strip according to claim 1 wherein the support frame comprising a continuous wire arranged in a zig-zag pattern to form the longitudinally displaceable frame portions, and wherein the degradable reinforcing material comprising warp threads secured to the frame portions.

5. The elastomeric strip of claim 1, wherein the degraded regions extend across substantially the entire width of the elastomeric strip.

* * * * *